Jan. 20, 1953 P. SNYDER 2,626,165
SAFETY LOAD BRACING DEVICE FOR VEHICLES
Filed Feb. 26, 1952

INVENTOR.
PETER SNYDER
BY Z. O. St. Palley
Patent Agent

Patented Jan. 20, 1953

2,626,165

UNITED STATES PATENT OFFICE 2,626,165

SAFETY LOAD BRACING DEVICE FOR VEHICLES

Peter Snyder, Hamden, Conn., assignor of one-half to Waldo Walter Grano, North Haven, Conn.

Application February 26, 1952, Serial No. 273,457

3 Claims. (Cl. 280—179)

My invention relates to improvement in safety load bracing devices for vehicles and has particular utility when used in milk delivery trucks and alike, in which the load, consisting of cases of milk bottles and alike, is stacked up behind the driver's compartment, with the consequence that, if the load is not secured properly, the impact of a very sudden stop may hurl cases against the driver, causing the loss of control of the vehicle, even collision and serious accident.

The principal object of my invention is to eliminate these, unfortunately frequent, accidents by providing a safety load bracing device that is reliable and efficient in operation and that can be installed easily and inexpensively in the existing milk delivery trucks and alike.

Another object of my invention is to provide a safety load bracing device that has a positive and sure retaining grip against impacts, the strength of which increases with the force of the impact and which does not depend on springs or other delicate parts subject to breakage due to crystallization.

A further object of my invention is to provide a safety load bracing device that can be released instantly and conveniently by raising the cross-bar; after which the cross-bar can be swung up above the load and pushed back, so that it will not interfere with the loading or unloading.

Another important object of my invention is to promote the safety of the driver by providing a safety load bracing device that he cannot remove from its supports; eliminating thereby the most frequent cause of these accidents, the missing cross-bar, that the driver has failed to replace under the assumption that, as the next stop is only a few minutes drive, no accident will happen.

Further objects and advantages of my invention will be apparent from the following description, which should be read with the understanding that changes, within the scope of the claims hereto appended, may be made in the form, construction and arrangement of the several parts herein shown and described, without departing from the spirit of the invention.

The accompanying drawing illustrates a preferred embodiment of my invention and a modification of one portion thereof.

Figure 1:
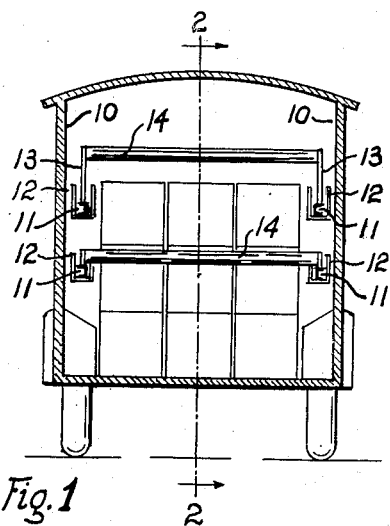
Figure 1 is a transverse section of a delivery truck equipped with two of my safety load bracing devices.
Figure 2:
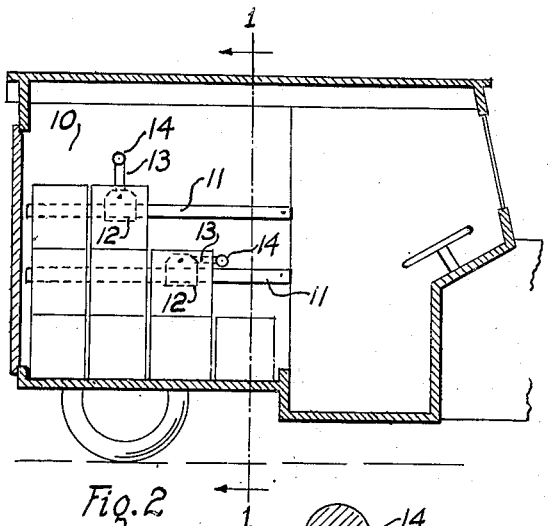
Figure 2 is a longitudinal section of the same truck.

In the drawing, Figs. 1 and 2 show a conventional milk delivery truck, in which the load, consisting of cases of milk bottles, is stacked up in several tiers on the rear platform, behind the driver's compartment. As an illustration, the drawing shows three tiers, two of which are equipped with my safety load bracing devices. In actual application the number of the tiers and of the load bracing devices may be different without departing from the spirit of my invention.

In Fig. 1 the reference numeral 10 designates the side walls of the truck, on which two pairs of parallel rails 11 are mounted. Each rail is connected to the wall only at its ends and between these end-supports there is a free space between the rail and the adjacent wall, which permits the holding member 12 to slide along the rail 11 from one end to the other. Extending between the rails of the same tier is cross-bar 14, the ends of which are secured to a pair of parallel arms 13, forming the U-shaped load bracing member. The free ends of these parallel arms 13 are pivotally connected to the respective holding members 12, so that the arms, together with the cross-bar, may be swung or rotated about the pivots out of a substantially horizontal plane up to a substantially vertical plane, and back into the original position. These two positions of the arms 13 and the cross-bar 14 are shown in Fig. 2 of the drawing. When arm 13 is horizontal, as in the second tier of Fig. 2, the cross-bar 14 braces the load, that is, resists the forward shifting of the load. When the arms 13 and cross-bar 14 are swung up, as in the top tier of Fig. 2, the cross-bar clears the load, that is, the whole device may be shifted on the rails without interfering with the load.

The above described swinging motion of the arm 13 and the cross-bar 14 has also another function, more fully shown and described later, which is an essential part of my invention.

Figure 3:
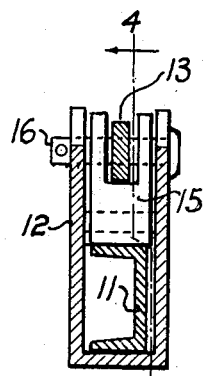
Figure 3 is an enlarged cross-section of the holding member, arm and the rail with an end-view of the cam.
Figure 4:
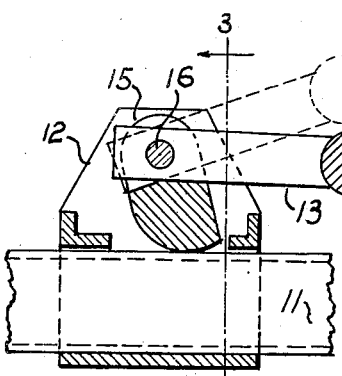
Figure 4 is a longitudinal section of the holding member and the cam, showing also a side-view of the arm in the horizontal and releasing positions.

Each holding member 12 is equipped with a frictional locking device, which is actuated by the arm 13 in such a manner, that when arm 13 is swung down into the horizontal it closes the frictional lock, and when arm 13 is swung up beyond a given angle, it will release the frictional lock. This part of my invention is illustrated in greater details in the following figures of the drawing. Fig. 3 shows a transverse section of the rail 11, the holding member 12 and the arm 13, also an end-view of the cam 15, which is mounted in the holding member 12. Cam 15 and arm 13 are connected to the holding member 12 by means of a pivot or pin 16. Fig. 4 shows a longitudinal section of the holding member 12 and the cam 15, and also a side-view of the rail 11 and arm 13. It will be noticed in Fig. 4 that cam 15 is so shaped that when the arm 13 is in the horizontal position, it rests on the cam 15, so that the weight of the cross-bar 14 will turn the cam clock-wise until the cam 15 exerts a pressure on the rail 11 and produces a frictional force. Any forward pull, transmitted by the arm 13 to the holding member 12, will tend to turn the cam 15 further in the clock-wise direction and increase the frictional force until the holding member 12 is securely locked on the rail.

The pivotal connection between the arm 13 and the cam 15, illustrated in Fig. 4, is so arranged that the arm 13 may be swung up into the position indicated by the dotted lines without changing the position of the cam 15; but if this upward motion of the arm 13 is continued further, the arm 13 will engage the cam 15 and will turn it counterclockwise, causing the release of the frictional lock between the holding member 12 and the rail 11.

Figure 5:
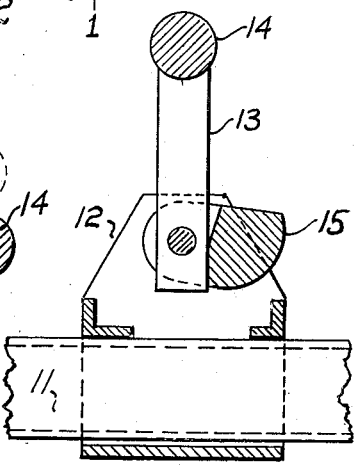
Figure 5 shows the same parts as Figure 4, except the arm and cross-bar are in the load clearing position.

Fig. 5 shows the final position in the upward motion of the arm 13. The object of this position is to raise the cross-bar 14 above the load in order to enable the operator to move the device out of the way when unloading cases.

Figure 6:
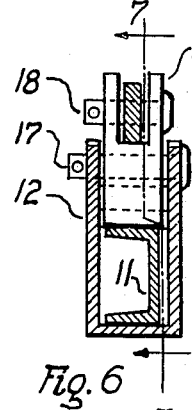
Figure 6 is a cross-section of the holding member with a modified form of the cam.
Figure 7:
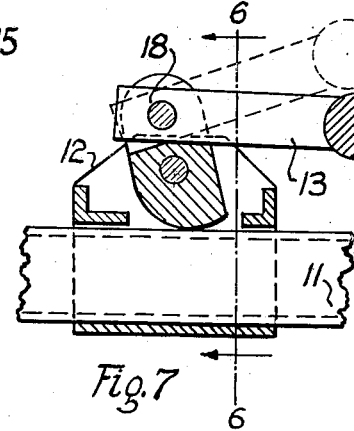
Figure 7 is a longitudinal section of the same modified form.

Fig. 6 shows a transversal section and Fig. 7 a longitudinal section of a modified form of my invention. In this form, the cam 15 has two pivots, 17 connects it to the holding member 12 and 18 connects it to the arm 13. In effect and operation this modified form is equivalent to the form first described and shown in Figs. 3, 4 and 5.

The operation of my invention is as follows:

The loading of the truck is usually done through a door in the rear wall, which is indicated in the drawing. During the loading operation the load bracing devices are moved to the front end of the rails and are locked in position by swinging down the cross-bars in the horizontal plane. The load bracing devices will remain in this position until the first stop on the delivery route, where the operator has to unload some cases. The unloading is done from the driver's compartment in the following manner. The operator lifts up the cross-bar in the top tier to release the frictional lock, then continues the upward motion until the cross-bar reaches the highest position. In this position, the load bracing device is pushed back beyond the cases to be unloaded, so as to be out of the way during the unloading. After the unloading of the selected cases is finished, the load bracing device is pulled forward and the cross-bar is swung down in front of the fore-most case remaining in the tier.

After the top tier has been completely unloaded the above described operation is repeated in the next tier.

I claim:

1. A pair of parallel rails mounted on opposite walls of a vehicle; a pair of holding members, each slidably mounted on one of said rails; a cross-bar extending between said rails and a pair of parallel arms, secured to the ends of said cross-bar, forming a U-shaped load bracing member, the free end of each of said arms being pivotally connected to one of said holding members, so as to permit the swinging of the arms, together with the cross-bar, from a substantially horizontal plane up to a substantially vertical plane; a pair of cams, each pivotally connected to one of said holding members and also to one of said arms, said cams being so adapted as to secure frictionally said holding members to the respective rails when said arms are in a substantially horizontal position and to permit the sliding of the holding members on the rails when said arms are swung up to a given angle or further, into a substantially vertical position.

2. A pair of parallel rails mounted on opposite walls of a vehicle; a pair of holding members, each slidably mounted on one of said rails; a U-shaped load bracing member having each end pivotally supported by one of said holding members, permitting the swinging of said load bracing member from a substantially horizontal plane up to a substantially vertical plane; a pair of cams, each pivotally connected to one of said holding members and also to the respective end of said load bracing member, said cams being so adapted that when said load bracing member is in a substantially horizontal plane its weight causes the cams to turn and exert pressure on the respective rails, producing a frictional lock to prevent the sliding of the holding members on the rails, and when said load bracing member is swung up to a given angle or further, it causes the cams to turn so as to release the frictional lock.

3. In a load bracing device, a pair of parallel rails mounted on opposite walls of a vehicle; a pair of holding members, each slidably mounted on one of said rails; a pair of cams, each pivotally mounted in one of said holding members, said cams being so adapted that, in their locking position, they lock frictionally said holding members against sliding on the rails, and in their releasing position, they permit the sliding of the holding members on the rails; a U-shaped load bracing member, having the ends pivotally supported by said holding members, said load bracing member being adapted, to brace the load and to hold said cams in the locking position, when said load bracing member is in a substantially horizontal plane, also to move said cam into the releasing position when said load bracing member is swung up to a given angle or further, and to clear the load when said load bracing member is swung up into a substantially vertical plane.

PETER SNYDER.

REFERENCES CITED

The following references are of record in the file of this patent:

UNITED STATES PATENTS

| Number | Name | Date |
|---|---|---|
| 1,585,504 | Lehecka | May 18, 1926 |
| 2,301,866 | Goodall | Nov. 10, 1942 |
| 2,359,109 | Hormes | Sept. 26, 1944 |
| 2,495,197 | McMullen | Jan. 17, 1950 |